United States Patent [19]
Papadimitriou et al.

[11] Patent Number: 5,592,626
[45] Date of Patent: Jan. 7, 1997

[54] SYSTEM AND METHOD FOR SELECTING CACHE SERVER BASED ON TRANSMISSION AND STORAGE FACTORS FOR EFFICIENT DELIVERY OF MULTIMEDIA INFORMATION IN A HIERARCHICAL NETWORK OF SERVERS

[75] Inventors: Christos Papadimitriou, La Jolla; P. Venkat Rangan, San Diego, both of Calif.

[73] Assignee: The Regents of the University of California, Oakland, Calif.

[21] Appl. No.: 246,246

[22] Filed: May 19, 1994

Related U.S. Application Data

[63] Continuation-in-part of Ser. No. 192,654, Feb. 7, 1994.

[51] Int. Cl.$^6$ .......................... G06F 13/00; H04N 7/173; H04H 1/02
[52] U.S. Cl. ........................................... 395/200.09; 348/7
[58] Field of Search .................. 395/200.07, 200.09; 328/7; 370/61

[56] References Cited

U.S. PATENT DOCUMENTS

| | | | |
|---|---|---|---|
| 4,495,570 | 1/1985 | Kitajima et al. | 395/650 |
| 4,538,176 | 8/1985 | Nakajima | 348/7 |
| 5,117,422 | 5/1992 | Hauptschein et al. | 370/95.1 |
| 5,172,413 | 12/1992 | Bradley et al. | 380/20 |
| 5,341,474 | 8/1994 | Gelman et al. | 395/200.09 |
| 5,421,031 | 5/1995 | DeBey | 455/5.1 |

OTHER PUBLICATIONS

Gelman A. D. "On Buffer Requirement for Store–And–Forward Video On Demand Service Circuits", Globecom '91, IEEE pp. 0976–0980.

Gelman A. D. "Analysis of Resource Sharing in Information Providing Services", IEEE 1990 pp. 0312–0316.

A store–and–Forward Architecture for Video–on–Demand Service A. D. Gelman & others, pp. 0842–0846, GlobeCom '91.

Optimization Model For The Delivery Of Interactive Multi Media Documents, S. L. Hardt–Kornacki & others, pp. 0669–0673 GlobeCom '91.

"A Digital On–Demand Video Service Supporting Content-–Based Queries," by T. D. C. Little & others, ACM Multimedia, pp. 427–436, Jun. 1993.

"Streaming RAID™–A Disk Array Management System For Video Files" by Fouad A. Tobagi & others, ACM Multimedia, pp. 393–400, Jun. 1993.

"Designing an On–Demand Multimedia Service," By P. Venkat Rangan & Others, IEEE Communications Magazine, pp. 56–64, Jul. 1992.

*Primary Examiner*—Thomas C. Lee
*Assistant Examiner*—D. Dinh
*Attorney, Agent, or Firm*—Fuess & Davidenas

[57] ABSTRACT

A multimedia information delivery network system is disclosed for delivering multimedia programs to a plurality of users at user-selected times. The network includes a wide area transmitter for transmitting the multimedia programs. Additionally, the network includes a plurality of network servers for receiving the programs and for selectively caching the programs for retransmission to downstream network servers and/or directly to one or more users at the user-selected transmission times. A scheduler receives the user-selected transmission times and, in response thereto, establishes a network server path by which the multimedia program is efficiently delivered to each user at the respective user-selected time.

13 Claims, 5 Drawing Sheets

SYSTEM AND METHOD FOR SELECTING CACHE SERVER BASED ON TRANSMISSION AND STORAGE FACTORS FOR EFFICIENT DELIVERY OF MULTIMEDIA INFORMATION IN A HIERARCHICAL NETWORK OF SERVERS

FIELD OF THE INVENTION

The present application is a continuation-in-part of, and claims priority from, co-pending U.S. patent application Ser. No. 08/192,654, filed Feb. 7, 1994, for an invention entitled "SYSTEM FOR EFFICIENT DELIVERY OF MULTIMEDIA INFORMATION", the disclosure of which is incorporated herein by reference.

The present invention relates generally to multimedia system architectures, and more particularly to methods and systems for efficient, on-demand delivery of multimedia information and programs.

BACKGROUND

Historically, both educational information and entertainment programs have been generated by content providers and delivered to users in a variety of formats, including printed publications, data storage media, and electronic broadcast signals. To access printed publications and data storage media, users are required to borrow or purchase the publications or media. This typically requires the users who desire access to travel to the information storage facilities to obtain the desired media, and in any case to store the media at the users' facilities for access at a time convenient for the users.

On the other hand, gaining access to information carried by broadcast signals is comparatively simpler, requiring only that the user tune a receiver in to the broadcast at the scheduled broadcast time. Unfortunately, the information sought by the user is available only at the time of broadcast, which may not necessarily be the time most convenient to the user.

Nevertheless, recognizing the advantages inherent in electronically broadcasting information, many content providers now electronically publish educational information for broadcast which was previously made available only in printed publications. A trend is therefore clearly emerging, colloquially termed the "information superhighway", in which large amounts of educational and entertainment programs and information ("multimedia") will be electronically available to a large number of users. Stated differently, multimedia encompasses both traditional audio-video television-type programs and programs spawned by the convergence of diverse industries and technologies including communications, computer, entertainment, publishing, film, and television, and multimedia programming is expected to be widely available.

Under certain circumstances, a user may be able to record a broadcast program for review at a later, more convenient time than the broadcast time. It will be appreciated, however, that requiring each user to store a particular program on a storage medium, e.g., a VCR, dedicated only to that user is inefficient. More particularly, each user must obtain his or her own storage medium and record the program separately from the storage media of other users, thereby duplicating resources and effort and consequently greatly increasing the overall cost to the users who wish to access the program.

Not surprisingly, attempts have been made to address the problem noted above by providing multimedia architectures which permit so-called "video-on-demand". Most of these architectures share the common attribute of requiring immense central data storage servers capable of storing vast amounts of data. These architectures necessarily entail unprecedented demands on the networks over which the data from the storage servers can be transmitted to users.

Unfortunately, a single motion picture requires several gigabytes of storage space. Accordingly, it will be appreciated that storing a full library of motion pictures, a full library of digitized literature and imagery, encyclopedic data, and so on, and, in turn, broadcasting such information on demand to various users at various times around the clock, would stretch and exceed the capacity of current storage and network technology.

In light of the above, it is an object of the present invention to provide a multimedia architecture for efficiently delivering video at user-defined times. Another object of the present invention is to provide a hierarchical multimedia delivery architecture which is easy to use and cost-effective.

SUMMARY OF THE INVENTION

A system for delivering a multimedia program to a plurality of users includes at least one wide area server for transmitting the multimedia program. Also, the system includes a plurality of network servers for receiving the multimedia program from the wide area server and for selectively caching the multimedia program for respective storage time periods. The network servers transmit the multimedia at the expirations of their respective storage time periods to the users. In one special case, at least some of the network servers are all arranged in tandem.

Typically, the transmission of a program from a server has an associated predetermined transmission factor. Further, each storage time period has an associated predetermined caching factor which increases over time and each storage time period also defines an associated preselected end time. The transmission factors and caching factors associated with delivering the program from the metropolitan area server to each of the users at the respective preselected times establishes an aggregate delivery factor. A scheduler is provided for receiving the preselected times from the users and for establishing the storage time periods in response thereto to minimize the aggregate delivery factor.

In accordance with the present invention, the scheduler also determines which network servers cache the program for each user. Additionally, the scheduler causes a network server to cache the multimedia program only at one of the preselected times. Moreover, the scheduler prevents a downstream network server from transmitting the program back to the wide area server.

In another aspect of the present invention, a multimedia delivery network for delivering a multimedia program to a plurality of users has a network architecture that is characterized by at least one wide area multimedia program transmitter. Also, the network includes at least one network switch in tandem with the wide area multimedia program transmitter for relaying the multimedia program to a user. Furthermore, the network includes a network storage device which is associated with the network switch for caching the multimedia program for a storage time period and for causing the switch to retransmit the multimedia program to a user at a preselected time.

In still another aspect of the present invention, a method is disclosed for delivering a multimedia program to a plurality of users at user-selected times. The method of the present invention includes the steps of transmitting the program from a wide area transmitter, and receiving the program at a plurality of network servers. Then, each network server is caused to retransmit the program to the end users at one or more of the respective preselected times. Preferably, the method further includes causing one or more network servers to cache the program for an associated storage time period. For optimal performance, a downstream network server would tap the program as it flows from an upstream network server to the end user.

In an alternate embodiment, for a multimedia system which includes a plurality of program servers, a method is disclosed for delivering a multimedia program which has a primary transmission time to first and second users at respective user-selected first and second times, wherein the first time is simultaneous with or subsequent to the primary transmission time and the second time is subsequent to the first time. The method includes the steps of, for each server, determining a first transmission factor that is associated with transmitting the program from the server to the first user. Then, for each server, a first storage factor which is associated with storing the program at the server from the primary transmission time to the first time is determined. Then, the server with the lowest combined first transmission factor and first storage factor is designated as the first server for transmitting the program to the first user at the first time.

Next, for each server, a second transmission factor which is associated with transmitting the program from the server to the second user is determined. Also, for each server, a second storage factor which is associated with storing the program at the server from the first time to the second time is determined. The server having the lowest combined second transmission factor and second storage factor is designated the second server for transmitting the program to the second user at the second time.

In another aspect of the alternate embodiment, a multimedia system is disclosed for delivering a multimedia program having a primary transmission time to first and second users at respective user-selected first and second times. The first time is simultaneous with or subsequent to the primary transmission time and the second time is subsequent to the first time, and the system of the present invention includes a plurality of program servers.

The system further includes means for determining, for each server, a first transmission factor associated with transmitting the program from the server to the first user, and means for determining, for each server, a first storage factor associated with storing the program at the server from the primary transmission time to the first time. Further, the system includes means for designating as a first server the server having the lowest combined first transmission factor and first storage factor for transmitting the program to the first user at the first time.

Additionally, the system includes means for determining, for each server, a second transmission factor associated with transmitting the program from the server to the second user, and means for determining, for each server, a second storage factor associated with storing the program at the server from the first time to the second time. In accordance with the present invention, the system also includes means for designating as a second server the server having the lowest combined second transmission factor and second storage factor for transmitting the program to the second user at the second time.

In still another aspect of the alternate embodiment, a method is disclosed for delivering a multimedia program to a plurality of users at respective user-defined viewing times from a network having a plurality of servers, with each server including a cache for storing the program with at least one of the servers being in the transmission path between another server and a user. The method includes, for the user having the second-earliest associated viewing time, determining a transmission factor associated with transmitting the program from the server to the user for each server that can be used as a cache for the user. Further, the method includes determining the lower of a first test storage factor associated with storing the program at the server from the last time the server was used as a cache until the associated viewing time and a second test storage factor associated with storing the program at the server from the last time the server was on a transmission path to a previous user until the associated viewing time, for each server that can be used as a cache for the user.

Next, the lower of the first test storage factor and second test storage factor is selected as a storage factor, and the server that has the lowest combined transmission factor and storage factor is selected for transmitting the program to the user at the associated viewing time. The process described above is repeated for each subsequent user, in chronological order of the associated viewing times.

The details of the present invention, both as to its structure and operation, can best be understood in reference to the accompanying drawings, in which like reference numeral refer to like parts, and in which:

DESCRIPTION OF THE PREFERRED EMBODIMENT

Figure 1:
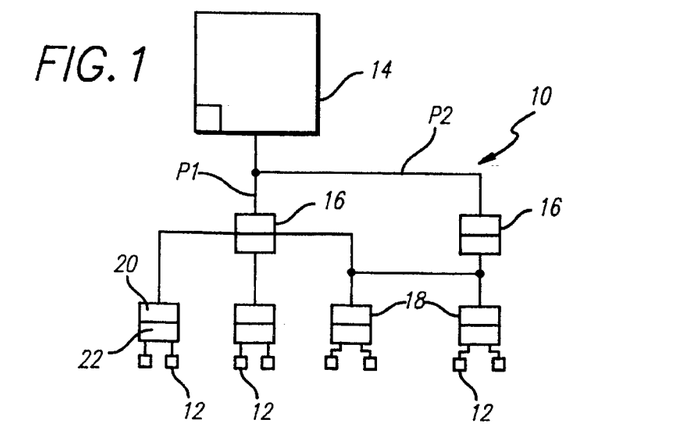
FIG. 1 is a schematic diagram showing a hierarchical multimedia network architecture.

Referring initially to FIG. 1, a hierarchical multimedia network is shown, generally designated 10. In accordance with the present invention, the network 10 transmits video-based programs, including multimedia educational and entertainment programs that may contain alpha-numeric displays in addition to video displays and audio signals, to a plurality of users 12. Stated differently, the present invention encompasses the delivery of both traditional audio-video television-type programs, as well as multimedia programs spawned by the convergence of diverse industries and technologies including communications, computer, entertainment, publishing, film, and television. It is to be understood that the network 10 transmits its video-based programs via fiber-optics communication lines and other land lines known in the art, satellite broadcast, personal wireless communications, and/or some combination of the above.

As the skilled artisan will appreciate, the users 12 include personal or local receiving apparatus, e.g., personal television sets or computers. Each user 12 may be linked to the network 10 by land lines or via personal wireless communications. Also, as more fully disclosed below, each user 12 may include automated means for selecting particular multimedia programs transmitted by the network 10, and for selecting the times at which the user 12 wishes to view the particular programs.

As shown in FIG. 1, the network 10 includes at least one wide area server 14. The wide area server 14 may be any appropriate wide area multimedia transmitter, e.g., the equipment associated with transmitting the signals of a network news company.

Also, the network 10 includes at least one and preferably a plurality of primary network servers 16. As shown in FIG. 1, each primary network server 16 is in tandem with the wide area server 14. In other words, each primary network server 16 receives the signals transmitted by the wide area server 14. In one presently preferred embodiment, each primary network server 16 is a metropolitan area server, e.g., the equipment associated with transmitting the signals of a metropolitan cable television company.

Further, a plurality of secondary network servers 18 are each arranged in tandem with an associated primary network server 16 for receiving signals therefrom, and as shown in FIG. 1 one primary network server 16 can feed signals to one or more secondary network servers 18. In turn, a secondary network server 18 can feed signals to other secondary network servers (not shown). Thus, the primary servers 16 are upstream from their associated secondary servers 18, and downstream from the wide area server 14. In other words, a downstream network server can tap the program as it flows from an upstream network server to the end user. Each secondary network server 18 can be a multimedia hub, e.g., a neighborhood electronic signal transmission and storage facility.

While FIG. 1 shows two levels of network servers 16, 18, it is to be understood that the network 10 can include additional levels of network servers (not shown).

Each network server 16, 18 (and any additional levels of network servers) includes an associated switch 20 and an associated storage device 22. Each switch 20 can advantageously be a network toll switch as is well-known in the art. Thus, each network toll switch 20 essentially functions as a relay by retransmitting, at a preselected time to the server 16, 18 (or user 12) that is immediately downstream of the particular switch 20, the signal received from the server 14, 16, or 18 that is immediately upstream of the server associated with the particular switch 20. The preselected time for retransmission may of course be instantaneously upon receipt of the signal from the upstream server 16, 18.

Moreover, each storage device 22 can be a well-known electronic media storage device, e.g., a magnetic or optical disc with associated support equipment. Accordingly, each storage device 22 can electronically copy, i.e., store, predetermined programs which are received at the associated server 16, 18 for subsequent retransmission of the programs by the associated switch 20.

Figure 2:
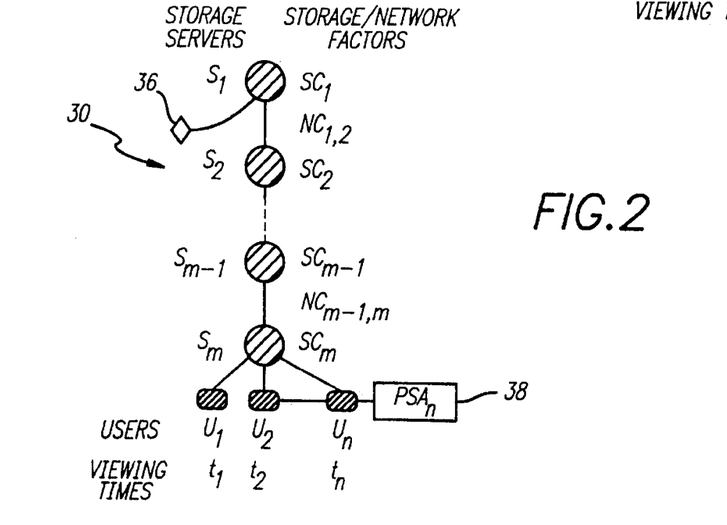
FIG. 2 is a schematic diagram showing a simplified multimedia network architecture using only a single path of tandem servers.

FIG. 2 shows a simplified multimedia network, generally designated 30, having a wide area server $S_1$ and a series of network servers $S_2$-$S_m$ arranged in tandem for delivering multimedia programs to a plurality of users $U_1$-$U_n$ at respective preselected delivery times $t_1$-$t_n$. Each transmission from a server $S_{k-1}$ to a server $S_k$, $k \in (1,m)$ entails an associated transmission factor $NC_{k-1,k}$ which is ordinarily a constant value.

Also, an associated storage factor $SC_k$ is associated with the storage of a program at a server $S_k$, and each storage factor $SC_k$ increases linearly in proportion to the time period during which the associated program is stored at the server $S_k$. Stated differently, each storage factor $SC_k$ is essentially the product of a fixed storage coefficient $SC_{kcoef}$ and a storage time period. Together, the aggregate transmission factors $\Sigma_{k=1}nNC_{k-1,k}$ and storage factors $\Sigma_{k=1}nSC_k$ establish an overall aggregate delivery factor.

As intended by the present invention, the overall efficiency of the network 30, as measured by the aggregate delivery factor, is minimized by judiciously selecting which servers S store and retransmit the program to which users U as per the following disclosure. It is to be understood that the factors discussed above may in practice be expressed in units such as time, bandwidth, memory capacity, transmission power, and even monetary cost.

Figure 3:
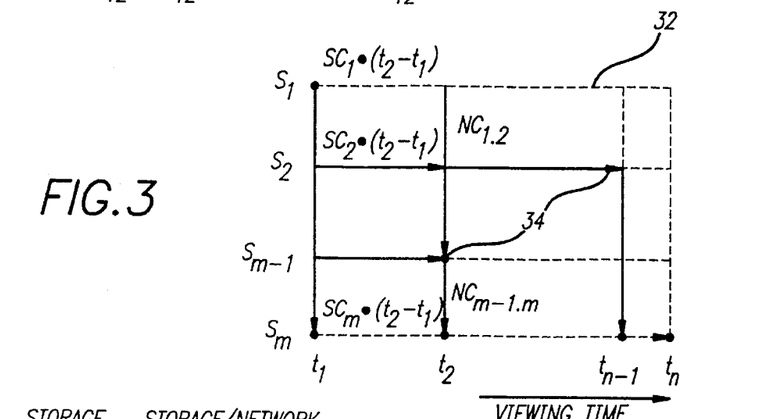
FIG. 3 is a graphical representation of the network shown in FIG. 2.

FIG. 3 is a graphical representation of the network 30 shown in FIG. 2, wherein the network 30 has been mapped to a two dimensional grid 32 which shows the various ways in which a program can be delivered to the users $U_1$-$U_n$. As shown, the ordinate of the grid 32 represents the servers $S_1$-$S_m$, and the abscissa represents the preselected viewing times $t_1$-$t_n$ in increasing temporal sequence.

Accordingly, the skilled artisan will appreciate that the vertical lines within the grid 32 represent and are proportional to the transmission factors NC and the horizontal lines represent and are proportional to the storage factors SC. Thus, by minimizing the total length of the lines extending between the O, $S_1$ vertex and the $t_n$, $S_m$ vertex, the aggregate delivery factor can be minimized.

In the network 30 architecture represented in FIGS. 2 and 3, the aggregate delivery factor can be minimized by selecting a path with the following constraints: The path must be rooted at the O, $S_1$ vertex and extend to the $t_n$, $S_m$ vertex; the path of the program to the $n^{th}$ user (denoted by the arrows 34 in FIG. 3) must extend downwardly and rightwardly from the O, $S_1$ vertex, and cannot extend leftwardly (or back to the wide area server) during any portion of the delivery; and the program is transmitted from one server $S_{a-1}$ to its downstream server $S_a$ (or to a user U) only at one of the preselected viewing times $t_1, t_n$. Stated differently, the program is transmitted from an upstream server $S_{a-1}$ to its downstream server $S_a$ only when the program is to be transmitted from the upstream server $S_{a-1}$ to a user U, and at no other times.

Figure 4A:
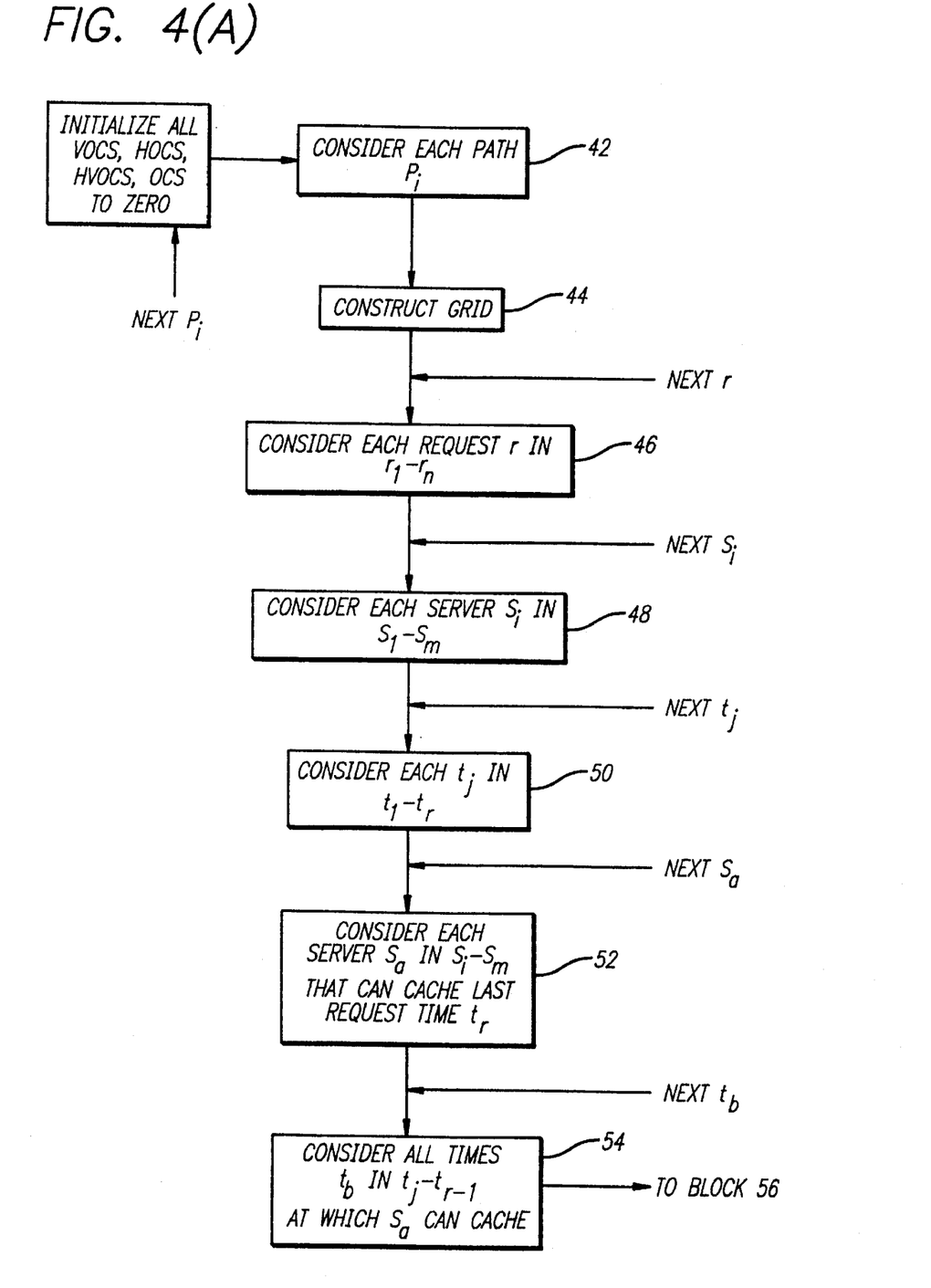
FIG. 4A & B is a flow chart showing the operational steps of the network shown in FIG. 2.
Figure 4B:
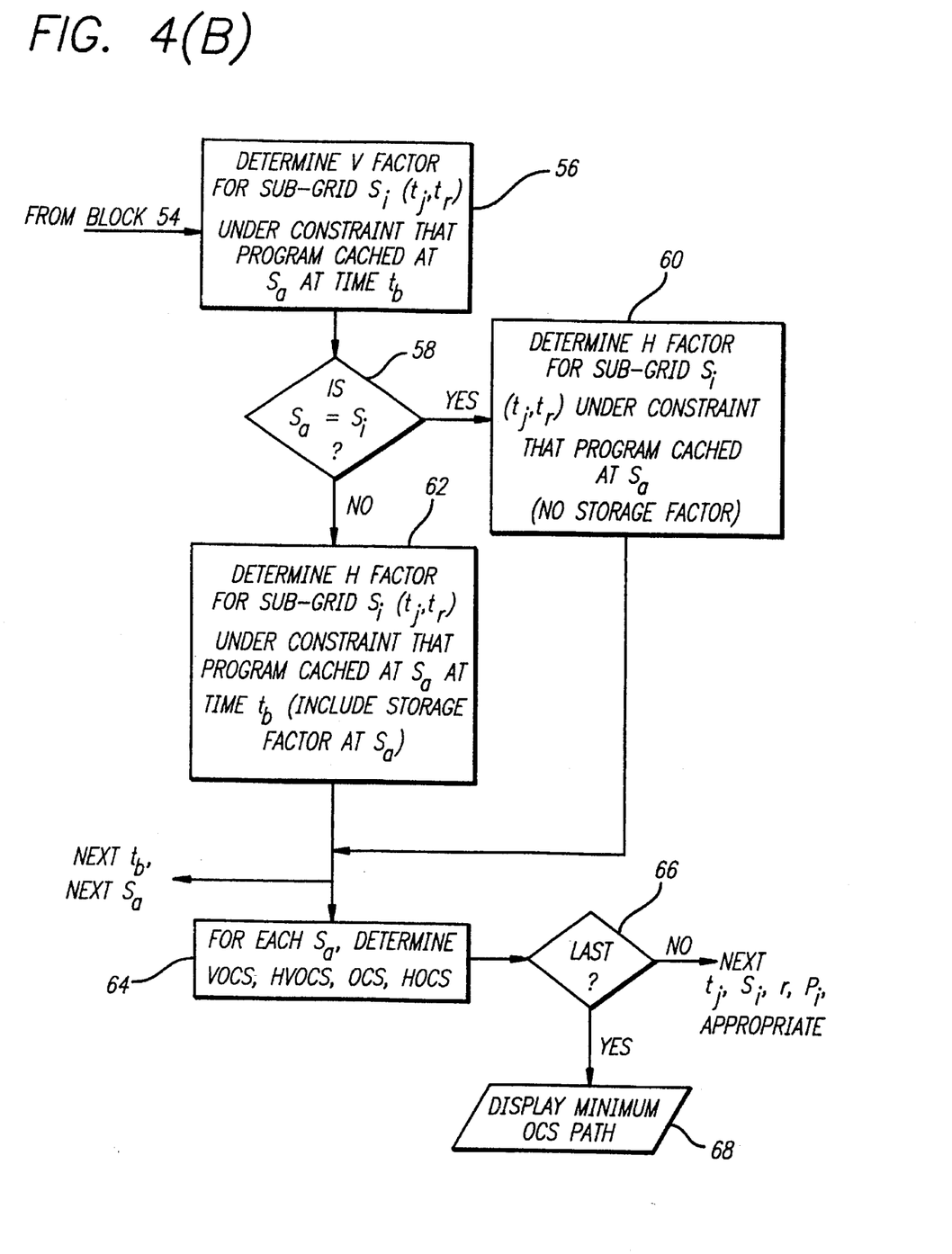

FIG. 4 is a flow chart showing the operational steps of the network 30 shown in FIGS. 2 and 3. It can be shown for the simplified tandem network 30 shown which uses only a single path of servers S, the below-described method optimally minimizes the aggregate delivery factor of the network 30. It is to be understood that the analysis disclosed below can be performed by a scheduler 36 (e.g., a type 486 personal computer) which is located at the server $S_1$ or any of the other servers S. Or, the analysis described below can be performed by a scheduler that is a personal service agent (PSA) 38 associated with a respective user U. The PSA 38 is described more fully below.

Starting at block 40 in FIG. 4, the scheduler 36 initializes certain parameters to zero. These parameters include all optimal caching schedule factors designated herein as HOCS, VOCS, HVOCS, and OCS.

It is to be understood that $[S_i][t_j, t_r]$ represents a grid having its leftmost vertex at $(t_j, S_i)$ and its rightmost vertex at $(t_r, S_m)$. As intended by the present invention, $S_i$ is the optimal server at which to cache a program for delivery to the last user $U_r$ (i.e., the user requesting program delivery at a time subsequent to program delivery to all other users) at time $t_r$, $S_m$ is the last server in the tandem series of servers, and $T_j$ is the optimal time at which the optimal server $S_i$ caches the program.

In accordance with the present invention. $OCS[S_i][t_j, t_r]$ represents the optimum caching schedule factor for the grid $[S_i][t_j, t_r]$. $HOCS[S_i][t_j, t_r]$ represents the optimum caching schedule factor for the grid $[S_i][t_j, t_r]$ under the constraint that the program is being cached at server $S_i$ during the entire time period $t_j$ to $t_r$. Such a constraint is necessary to ensure optimization. Also, none of the servers upstream of $S_i$ can be used in this schedule, in order to avoid contradicting the definition of time $t_j$ as being the optimal caching time for $S_i$.

Moreover, $VOCS[S_i, S_k][t_j, t_r]$ represents the optimum caching schedule factor for the grid $[S_i][t_j, t_r]$ under the constraint that one of the servers $S_k$, $k \in [1,i]$ is used for servicing the last user $U_r$. Furthermore, $HVOCS[S_i, S_k[]t_j, t_r]$ represents the optimum caching schedule factor for the grid $[S_i][t_j, t_r]$ under the constraints that one of the servers $S_k$ is used for servicing the last user $U_r$, and that the program is cached at server $S_i$ during the period $t_j$ to $t_r$.

Blocks 42–54 represent a nested series of iterations that are next performed by the scheduler 36. Specifically, block 42 indicates that each path $P_i$ in a multi-tandem hierarchical network is considered (FIGS. 2 and 3 represent a tandem network 30 which has only a single path, whereas FIG. 1 represents a network 10 which has two paths $P_1$, $P_2$). Then, as indicated at block 44, for each path the scheduler 36 receives the delivery times $t_1$-$t_r$ from the respective users $U_1$-$U_n$, and constructs the grid 32.

Block 46 indicates that the below-described steps are completed for each user request "r", from $r_1$ to $r_n$ at respective delivery times $t_1$ to $t_r$. Next, block 48 indicates that for each user request r, the below-described steps are completed for each server $S_i$. For each server $S_i$, block 50 indicates that the below-described steps are completed for each time $t_j$, from $t_1$ to $t_r$. Thus, for any rectangular grid $[S_i][t_j, t_r]$ there are $(t_j-t_r)*(S_m-S_i)$ sub-grids for which horizontal and vertical constraints must determined.

Also, block 52 indicates that for each time $t_j$, the below-described steps are completed for each server $S_a$ in $S_i$ to $S_m$. In other words, there are only $(S_m-S_i)$ possible ways in which the program can reach the client r.

Further, block 54 indicates that for each server $S_a$ the below-described steps are completed for each time $t_b$ in $t_j$ to $t_{r-1}$. As intended by the present invention, $t_b$ is the time at which the server $S_a$ caches the program.

Next, the factor $(V_{fac})$ associated with the vertical constraints of the sub-grid $[S_i][t_j, t_r]$ is determined by the scheduler 36 at block 56 as follows:

$$V_{fac}=VOCS[S_i, S_a][t_j, t_b]+HOCS[S_a][t_b, t_{r-1}]+SC_{acoef}*(t_r-t_b)+\Sigma_{s=a}^{m-1}NC_{s,s+1}.$$

After determining $V_{fac}$, the scheduler 36 moves to block 58, wherein the scheduler 36 determines whether the server $S_a$ under consideration is the $S_i$ under consideration. If it is, the factor $(H_{fac})$ associated with the horizontal constraints of the sub-grid $[S_i][t_j, t_r]$ is determined at block 60 as follows:

$$H_{fac}=HVOCS[S_i, S_a][t_j, t_b]+HOCS[S_a][t_b, t_{r-1}]+SC_{acoef}*(t_r-t_b)+\Sigma_{s=a}^{m-1}NC_{s,s+1}.$$

Otherwise, because caching at $S_i$ does not entail a storage factor, $H_{fac}$ is determined at block 62 as follows:

$$H_{fac}=HVOCS[S_i, S_a][t_j, t_b]+HOCS[S_a][t_b, t_{r-1}]+\Sigma_{s=a}^{m-1}NC_{s,s+1}.$$

After determining $V_{fac}$ and $H_{fac}$, the scheduler 36 iteratively repeats the above-described steps for each $t_b$ associated with each particular $S_a$, and then for the remainder of the possible servers $S_a$ with associated caching times $t_b$. More particularly, the scheduler 36 moves back to block 54 to retrieve the next $t_b$, and then repeats blocks 56–62 as appropriate. Upon using the last $t_r$, the scheduler 36 moves to block 52 to retrieve the next server $S_a$, and repeats blocks 54–62 for all times $t_b$ for that server $S_a$. Each $V_{fac}$ and $H_{fac}$ so determined is stored, and then at block 64, the optimal schedules VOCS, HVOCS, OCS, and HOCS are determined as follows:

$VOCS[S_i, S_a][t_j, t_r]$=minimum $V_{fac}$ determined above among the various $V_{facs}$ for all servers $S_c$ in the range $S_i$ to $S_a$, with associated caching times $t_b$ for each server $S_c$ in the range of user request times from $t_j$ to $t_{r-1}$.

Also, $HVOCS[S_i, S_a][t_j, t_r]$=minimum $H_{fac}$ determined above among the various $H_{facs}$ for all servers $S_c$ in the range $S_i$ to $S_a$, with associated caching times $t_b$ for each server $S_c$ in the range of user request times from $t_j$ to $t_{r-1}$.

Further, $OCS[S_i][t_j, t_r]$=minimum $VOCS[S_i, S_a][t_j, t_r]$ for all servers $S_a$ in the range $S_i$ to $S_m$; and $HOCS[S_i][t_j, t_r]$=minimum $HVOCS[S_i, S_a][t_j, t_r]$ for all servers $S_a$ in the range $S_i$ to $S_m$.

After block 64, the scheduler 36 moves to block 66, wherein it is determined whether the last $t_j$ has been processed. If not, the scheduler 36 loops back to block 50 to retrieve the next $t_j$, and then repeats blocks 52–66. If the last $t_j$ has been processed, the scheduler 36 loops back to block 48 to retrieve the next $S_i$, and then repeats blocks 50–66. If the last $S_i$ has been processed, the scheduler 36 loops back to block 46 to retrieve the next user request, and then repeats blocks 48–66.

For the single-path tandem network 30 shown in FIGS. 2 and 3, the overall optimum path $OCS[S_i][t_j, t_n]$ resulting from the above steps defines the program transmission and caching paths to each user $U_n$. The output of the above steps is accordingly a series of transmission paths and storage server designations.

For the multi-path hierarchical network 10 shown in FIG. 1, after processing all user requests for path $P_1$, and obtaining and storing a corresponding $OCS[S_1][t_1, t_n]$, the scheduler loops back to block 40, reinitializes all VOCS, HOCS, HVOCS, and OCS to zero, and then steps through blocks 42–66 as described for the next path $P_2$. The minimum $OCS[S_1][t_1, t_n]$ so obtained is then displayed or otherwise output at block 68.

Figure 5:
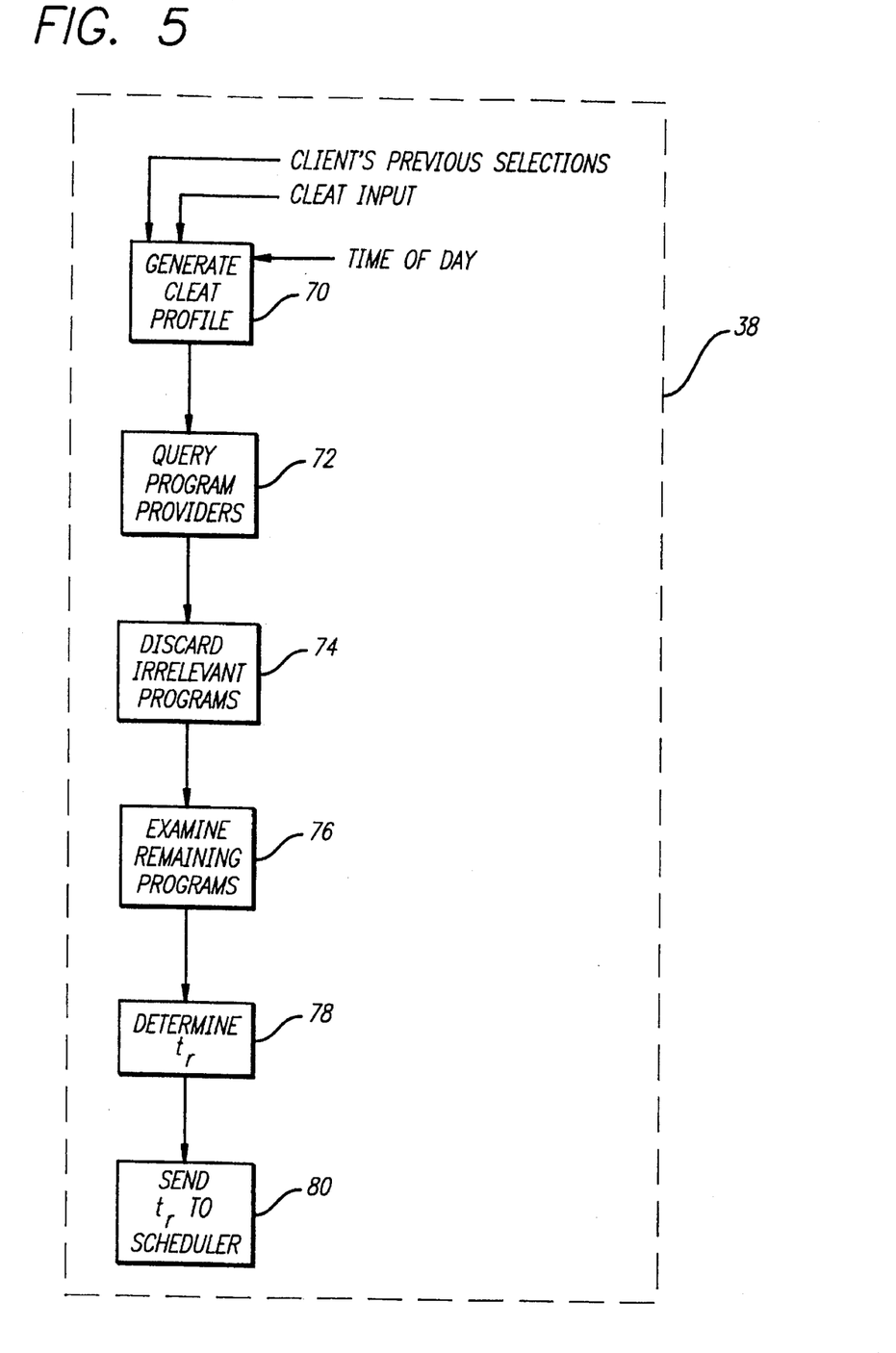
FIG. 5 is a flow chart showing the operational steps of a personal service agent.

Additionally, in cross-reference to FIGS. 2 and 5, each user $U_1$-$U_n$ can include a respective PSA 38 (only one PSA shown in FIGS. 2 and 5). Each PSA 38 is preferably a personal computer which analyzes the content of programs previously selected by the user's client (i.e., by the particular person being served) to select future programs for viewing by the client. Also, the PSA 38 schedules the selected programs for delivery to the client at the client's preferred viewing times.

Thus, when a PSA 38 is provided, the preselected delivery time $t_k$ discussed above is established by either the client of the user U or automatically, by the associated PSA 38. Moreover, in lieu of or in addition to the scheduler 36, the PSA 38 can optimize the transmission and storage factors borne by its associated user by adhering to the operational steps outlined above and shown in FIG. 4.

As shown at block 70 in FIG. 5, the PSA 38 initially analyzes the content of the programs selected by the client of the associated user U to generate inferences regarding the client's preferences. These inferences can depend on the time of day, i.e., the PSA 38 may note that the client prefers news formats in the early morning and educational programming in the evening.

Also, the PSA 38 can generate inferences of client preferences based direct client input regarding preferences. Based upon the inferences generated at block 70, the PSA 38 moves to block 72 to query program providers to determine the availability of programs relevant to the client's preferences. At block 74, the PSA 38 discards programs which are completely uninteresting to the client.

Then, at block 76, the PSA 38 examines the content of the remaining programs to determine which programs are to be delivered to the client by e.g., the network 10 or the network 30. At block 78, the PSA 38 determines when delivery is to occur (i.e., the PSA 38 determines $t_r$). Next, at block 80, the PSA 38 sends $t_r$ to the scheduler 36 for operation as disclosed in FIG. 4. Alternatively, the PSA 38 itself, in conjunction with other PSAs, can establish the delivery schedule in accordance with the method shown above.

Figure 6:
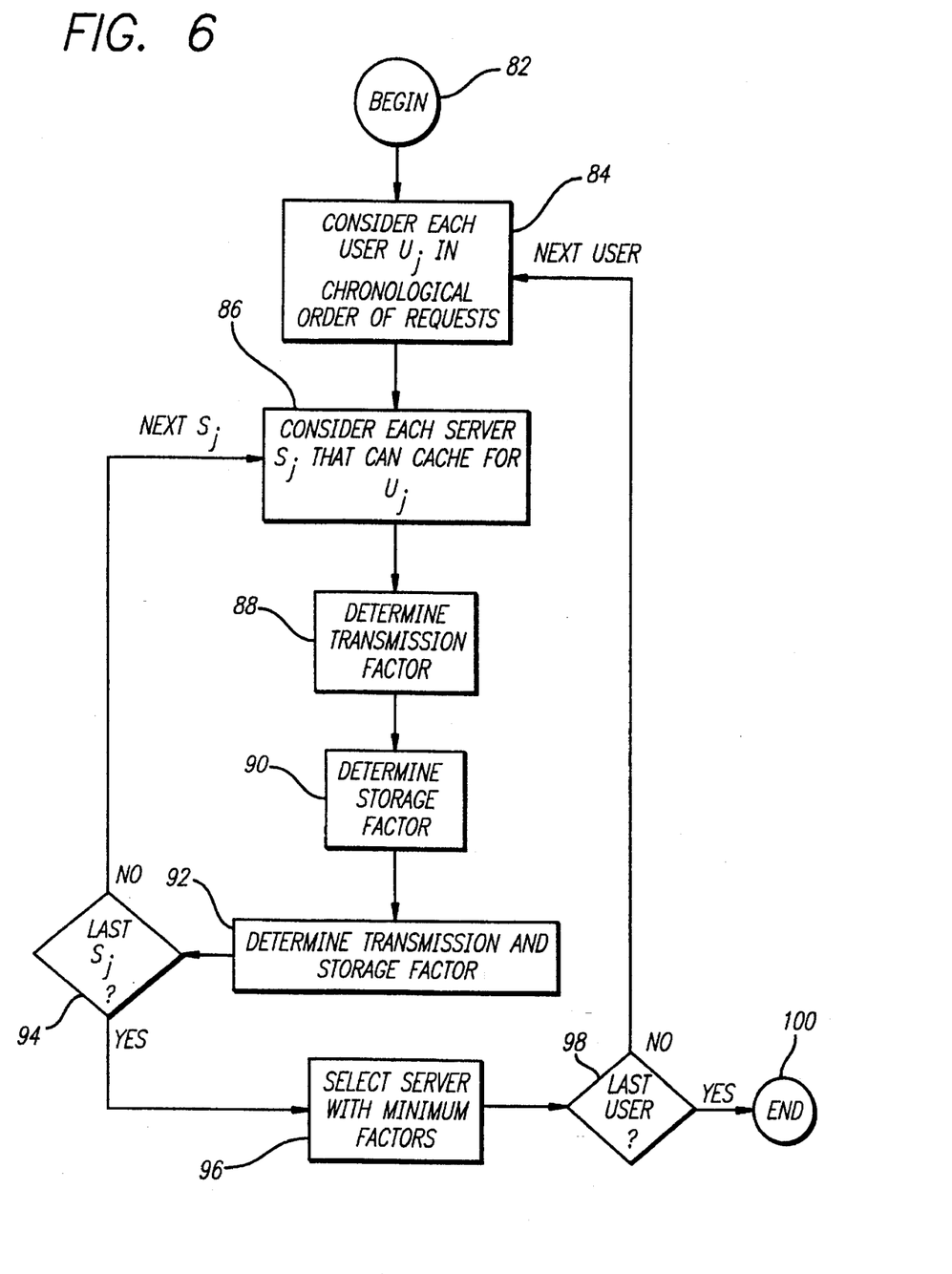
FIG. 6 is a flow chart showing an alternate embodiment of the operational steps of the network shown in FIG. 2.

Now referring to FIG. 6, an alternate embodiment of the operational method of the present invention is shown for use in conjunction with, e.g., the network 10 shown in FIG. 1. It is to be understood that the method shown in FIG. 6 is used to deliver a program having a primary transmission time to "n" users $U_j$, $j \in \{1,n\}$ at associated delivery times $t_j$ using a network having "m" servers $S_j$, $j \in \{1,m\}$, wherein $t_1$ is the earliest requested time and corresponds to user $U_1$, and wherein at least one of the servers $S_j$ is in the transmission path between another server $S_k$, $k \in \{1,j-1\}$ and a user $U_j$. It is to be further understood that $t_1$ is simultaneous with or subsequent to the primary transmission time of the program, with each subsequent request time $t_i$, $i \in \{2,n\}$ being chronologically later than $t_{i-1}$.

Commencing at step 82, the process begins, and moves to block 84. At block 84, the method considers all users $U_j$ in chronological order of their associated user request times $t_j$. Thus, for the first iteration of the operational method shown in FIG. 6, the method considers the first user $U_1$, i.e., the user who has requested a program be delivered at some associated time $t_1$.

Next, at block 86, for each user $U_j$, the operational method considers each server $S_j$ that can cache a program for the user $U_j$ being considered. Thus, at block 86 during the first iteration of the method shown in FIG. 6, the method considers the first server $S_1$. At block 88, the method determines the transmission factor associated with transmitting the program from the server $S_j$ to the user $U_j$ in accordance with the principles disclosed above.

Next, at block 90, the method determines the storage factor associated with caching the program at the server $S_j$ since the last time $t_b$ the server $S_j$ was used as a cache or was on a transmission path to a previous user $U_{j-1}$ until the delivery time $t_j$. In so determining the storage factor, the method uses the below equation:

$$\text{storage factor} = SC_{jcoef} * (t_j - t_b)$$

wherein $SC_{jcoef}$=fixed storage coefficient for the server $S_j$.

Stated differently, at block 90 the method determines the lower of a first test storage factor that is associated with storing the program at the server $S_j$ from the last time the server $S_j$ was used as a cache until the associated viewing time $t_j$ and a second test storage factor associated with storing the program at the server $S_j$ from the last time the server $S_j$ was on a transmission path to a previous user $U_1$ until the associated viewing time $t_j$. As the skilled artisan will appreciate, for the first user $U_1$ and first server $S_1$, the storage factor will be zero.

Next, at block 92, the method determines the aggregate of the transmission factor plus the lower of the two storage time factors determined at block 90. From block 92, the method moves to decision block 94 to determine whether $S_j = S_m$. If not, the method loops back to block 86 to consider the next server $S_{j+1}$, i.e., the method repeats blocks 88-94 for the server $S_{j+1}$.

Otherwise, the method moves to block 96 and designates the server having the lowest aggregate transmission factor and storage factor as the $j^{th}$ server, $j \in \{1,n\}$. In other words, the $j^{th}$ server as determined at block 96 is the server which is to cache the program and deliver the program to the user $U_j$ under consideration. It is contemplated by the present invention that one server $S_j$ can be designated as the server for delivering the program to more than one user U.

From block 96, the method moves to decision block 98 and determines whether $U_j = U_n$. If not, the method loops back to block 84 and repeats blocks 86-98 for the next user $U_{j+1}$. Otherwise, the method moves to block 100 and terminates.

While the particular system for multimedia information delivery as herein shown and described in detail is fully capable of achieving the above-stated objects of the invention, it is to be understood that it is illustrative of but one preferred embodiment, that other embodiments may exist that will be obvious to those skilled in the art, and that the scope of the present invention accordingly is to be limited by nothing other than the appended claims.

What is claimed is:

1. In a multimedia delivery network system including a hierarchical plurality of program servers variously in various communication paths between a root node server and at least one first and one second user, a method for delivering a multimedia program having a primary time of transmission to the first and to the second users at respective user-selected first and second times, wherein the first time is simultaneous with or subsequent to the primary time of transmission and the second time is subsequent to the first time, and wherein the method comprises the steps of:

(a) for each of the hierarchical plurality of servers, determining a first transmission factor associated with transmitting if possible the program from the server to the first user;

(b) for each of the hierarchical plurality of servers, determining a first storage factor associated with storing the program at the server from the primary time of transmission to the first time;

(c) designating as a first server of the hierarchical plurality of servers the server having the lowest combined first transmission factor and first storage factor for receiving directly, or indirectly via other ones of the plurality of servers, the multimedia program from the root note server at the time of transmission, for storing the program until the first time, and for transmitting, directly or indirectly via other ones of the plurality of servers, the multimedia program to the first user at the first time;

(d) receiving directly, or indirectly via other ones of the plurality of servers, the multimedia program at the designated first server from the root note server at the time of transmission, storing the program at the designated first server until the first time, and transmitting, directly or indirectly via other ones of the plurality of servers, the multimedia program from the designated first server to the first user at the first time;

(e) for each of the hierarchical plurality of servers, determining a second transmission factor associated with transmitting if possible the program from the server to the second user;

(f) for each of the hierarchical plurality of servers, determining a second storage factor associated with storing the program at the server from the first time to the second time; and (g) designating as a second server of the hierarchical of servers the server having the lowest combined second transmission factor and second storage factor for receiving, indirectly from the root note server via the first server, the multimedia program from the first server at the first time, for storing the program until the second time, and for transmitting, directly or indirectly via other ones of the plurality of servers, the multimedia program to the second user at the second time;

(h) receiving, indirectly from the root note server via the first server, the multimedia program at the designated second server from the designated first server at the first time, storing the program at the designated second server until the second time, and transmitting, directly or indirectly via other ones of the plurality of servers, the multimedia program from the designated second server to the second user at the second time.

2. The method of claim 1, further comprising the step of:

(g) storing the program in the second server at the first time.

3. The method of claim 2, wherein the system transmits the program to a third user at a third time subsequent to the second time, and the method further comprises the steps of:

(h) for each server, determining a third transmission factor associated with transmitting the program from the server to the third user;

(i) for each server, determining a third storage factor associated with storing the program at the server from the second time to the third time; and (j) designating as a third server the server having the lowest combined third transmission factor and third storage factor for transmitting the program to the third user at the third time.

4. The method of claim 3, further comprising the step of:

(j) storing the program in the third server at the first or second time.

5. The method of claim 1, wherein the system delivers the multimedia program via personal wireless communications.

6. A multimedia delivery network system for delivering a multimedia program having a primary time of transmission to a first and to a second user each at a respective user-selected first and second time, wherein the first time is simultaneous with or subsequent to the primary time of transmission and the second time is subsequent to the first time, comprising:

a hierarchical plurality of program servers;

means for determining, for each of the plurality of program servers, a first transmission factor associated with transmitting if possible the program from the server to the first user;

means for determining for each of the hierarchical plurality of servers a first storage factor associated with storing the program at the server from the primary time of transmission to the first time;

means for designating as a first server of the hierarchical plurality of servers the server having the lowest combined first transmission factor and first storage factor for receiving directly, or indirectly via other ones of the plurality of servers, the multimedia program from the root note server at the time of transmission, for storing the program until the first time, and for transmitting, directly or indirectly via other ones of the plurality of servers, the multimedia program to the first user at the first time;

wherein the designated first server (i) receives directly, or indirectly via other ones of the plurality of servers, the multimedia program at the designated first server from the root note server at the time of transmission, (ii) stores the program until the first time, and (iii) transmits, directly or indirectly via other ones of the plurality of servers, the multimedia program to the first user at the first time;

means for determining for each of the hierarchical plurality of servers a second transmission factor associated with transmitting if possible the program from the server to the second user;

means for determining for each of the hierarchical plurality of servers, a second storage factor associated with storing the program at the server from the first time to the second time; and means for designating as a second server of the hierarchical plurality of servers the server having the lowest combined second transmission factor and second storage factor for receiving, indirectly from the root note server via the first server, the multimedia program from the first server at the first time, for storing the program until the second time, and for transmitting, directly or indirectly via other ones of the plurality of servers, the multimedia program to the second user at the second time;

wherein the designated second server (i) receives, indirectly from the root note server via the first server, the multimedia program from the first server at the first time, (ii) stores the program until the second time, and (iii) transmits, directly or indirectly via other ones of the plurality of servers, the multimedia program to the second user at the second time.

7. The system of claim 6, further comprising:

means for storing the program in the second server at the first time.

8. The system of claim 6, wherein the system transmits the program to a third user at a third time subsequent to the second time, and the system further comprises:

means for determining, for each server, a third transmission factor associated with transmitting the program from the server to the third user;

means for determining, for each server, a third storage factor associated with storing the program at the server from the second time to the third time; and means for designating as a third server the server having the lowest combined third transmission factor and third storage factor for transmitting the program to the third user at the third time.

9. The system of claim 8, further comprising:

means for storing the program in the third server at the first or second time, wherein the system delivers the multimedia program via personal wireless communication to at least one user.

10. A method for delivering a multimedia program to a plurality of users at respective user--defined viewing times from a network having a plurality of servers, each server including a cache for storing the program with at least one of the servers being in the transmission path between another server and a user, comprising the steps of:

for the user having the second-earliest associated viewing time:
(a) for each server that can be used as a cache for the user, determining a transmission factor associated with transmitting the program from the server to the user;
(b) for each server that can be used as a cache for the user, determining the lower of a first test storage factor associated with storing the program at the server from the last time the server was used as a cache until the associated viewing time and a second test storage factor associated with storing the program at the server from the last time the server was on a transmission path to a previous user until the associated viewing time, and selecting as a storage factor the lower of the first test storage factor and second test storage factor;
(c) designating as a user server the server having the lowest combined transmission factor and storage factor for transmitting the program to the user at the associated viewing time; and
(d) repeating steps (a)–(c) for each subsequent user, in chronological order of the associated viewing times.

11. A method of optimizing various deliveries of a multimedia program, transmitted from a base source at a base transmission time, to each of a multiplicity of users each at a respective preselected receipt time concurrent with or later than the base transmission time, the method comprising:

organizing a hierarchical tree of network servers between the base source and the multiplicity of users, one or more network servers being located between each of the users and the base source;

transmission-factor-determining for each of the servers a first-user transmission factor associated with transmitting if possible the program from each server to a first user;

cache-time-determining for each of the servers a first-user storage factor associated with storing the program at each server from the base time until the respectively preselected time of the first user;

designating as a first server that server between the base source and a first user which server has the lowest associated combined transmission-factor-determined first-user transmission factor and cache-time-determined first-user storage factor;

receiving at the first server directly, or indirectly via other ones of the plurality of servers, the multimedia program from the root node server at the base transmission time;

storing at the first server the program until the preselected receipt time of the associated first user; and then transmitting, directly or indirectly via other ones of the plurality of servers, the multimedia program to the first user at the first-user receipt time.

12. The method of optimizing various deliveries of a multimedia program according to claim 11 further comprising:

transmission-factor-determining for each of the servers a second-user transmission factor associated with transmitting if possible the program from the first server to a second user;

cache-time-determining for each of the servers a second-user storage factor associated with storing the program at each server from the first-user receipt time until the respectively preselected time of a second user;

designating as a second server that server between the first server and the second user which server has the lowest associated combined transmission-factor-determined second-user transmission factor and cache-time-determined second-user storage factor;

receiving at the second server directly, or indirectly via other ones of the plurality of servers including the first server, the multimedia program from the root note server by time of the first-user receipt;

storing at the second server the program from at least the first-user receipt time, if not longer, until the preselected receipt time of the associated second user; and then transmitting, directly or indirectly via other ones of the plurality of servers, the multimedia program to the second user at the second-user receipt time.

13. The method of optimizing various deliveries of a multimedia program according to claim 11 further comprising:

transmission-factor-determining for each of the servers an (n)th-user transmission factor associated with transmitting if possible the program from the (n−1) server to an (n)th user;

cache-time-determining for each of the servers an (n)th-user storage factor associated with storing the program at each server from the (n−1)th-user receipt time until the respectively preselected time of a (n)th user;

designating as an (n) th server that server between the (n−1)th server and the (n)th user which server has the lowest associated combined transmission-factor-determined (n)th-user transmission factor and cache-time-determined (n)th-user storage factor;

receiving at the (n) th server directly, or indirectly via other ones of the plurality of servers including all servers 1, 2, . . . (n−1), the multimedia program from the root note server by time of the (n)th-user receipt;

storing at the (n)th server the program from at least the time of receipt thereof at the (n−1)th user, if not longer, until the preselected receipt time of the associated (n)th user; and then transmitting, directly or indirectly via other ones of the of servers, the multimedia program to the (n) th user at the (n)th-user receipt time.

* * * * *